C. ADAMS-RANDALL.
TELEPHONE TRANSMITTER.
APPLICATION FILED AUG. 31, 1907.
980,042.
Patented Dec. 27, 1910.
2 SHEETS—SHEET 1.
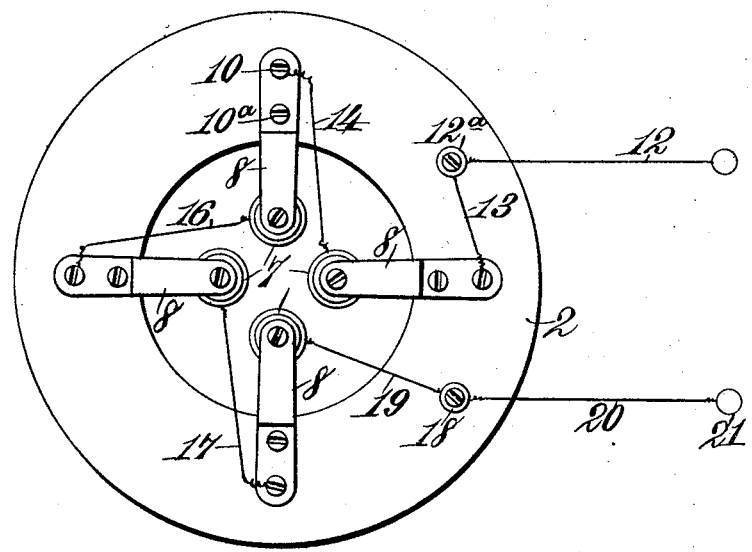
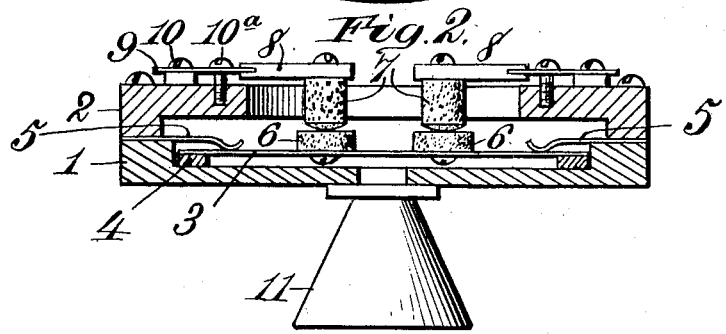
Witnesses.
Robert Everitt.
Inventor.
Charles Adams-Randall.
By James L. Norris.
Atty.

C. ADAMS-RANDALL.
TELEPHONE TRANSMITTER.
APPLICATION FILED AUG. 31, 1907.

980,042. Patented Dec. 27, 1910.

2 SHEETS—SHEET 2.

Fig. 3.

Witnesses:

Inventor
Charles Adams-Randall
By
James L. Norris
Atty.

UNITED STATES PATENT OFFICE.

CHARLES ADAMS-RANDALL, OF NEW YORK, N. Y.

TELEPHONE-TRANSMITTER.

980,042.

Specification of Letters Patent.

Patented Dec. 27, 1910.

Original application filed April 14, 1905, Serial No. 255,602. Divided and this application filed August 31, 1907. Serial No. 390,970.

*To all whom it may concern:*

Be it known that I, CHARLES ADAMS-RANDALL, a citizen of the United States, residing at New York, in the county of New York and State of New York, have invented new and useful Improvements in Telephone-Transmitters, of which the following is a specification.

This invention relates to telephone transmitters, and more particularly to that class adapted for use with "common battery" or "central energy" systems, and wherein currents of higher voltage are employed with the transmitters than local battery transmitters; and the essential or controlling feature of the present invention is means for regulating and obtaining the proper resistance of the transmitter proportionate to the current to be employed. Heretofore in central energy transmitters, the resistance has had a fixed value, or total normal resistance which has been obtained, generally, by increasing the depth of the variable resistance, or by the use of fine granules of high resistance of considerable depth, or of increasing the resistance of the circuit of which the transmitter is a part by introducing into said circuit a fixed or adjustable resistance invariable by the action of the transmitter. It has been found in such construction and adaptation that the variation of the resistance of the transmitter is reduced, the articulation impaired, and the output at the transmitter but slightly augmented, especially by the use of an added, fixed, non-variable resistance. The present invention seeks to overcome these defects and objections; and to this end consists more particularly in subdividing the total normal resistance of the transmitter into fractional parts or units, such parts or units being independent of one another, when not connected up in series, but arranged to be connected up in series with a source of electrical energy so that one or more units may be used, according to the resistance required. Under the principle of construction involved in the present invention, the variation of the current is made at each fractional part of the unit, or simultaneously at the several units, thereby multiplying the variation according to the number of parts or units, and whereby the variation of the current passing through the transmitter is not decreased, but rather augmented or is at least equally as great, or the same, irrespective of the number of units or the total resistance of the transmitter at its maximum resistance, or, in other words, whether the normal resistance is high or low. This arrangement is of great advantage, as the articulation is not impaired, nor the current power or output at the transmitter decreased, and "frying" or "arcing" is prevented.

In the accompanying drawings, the transmitter is shown as having but four units or fractional parts, but it will be understood that the number of units may be increased with a corresponding increase of voltage up to a maximum or high voltage.

The present invention embodies matter divided out of my pending application Serial No. 255,602, filed April 14, 1905.

In the drawings: Figure 1 is a plan view of a preferred form of transmitter and the circuit connections therefor embodying the features of the invention. Fig. 2 is a transverse vertical section of the transmitter. Fig. 3 is a plan view of a transmitter embodying the features of the invention and particularly illustrating the different parts or units connected up in series and showing a simple multiple form of switch means.

Similar characters of reference are employed to indicate corresponding parts in the views.

The numeral 1 designates one member of the body or frame of the transmitter which may be made of any suitable material and has secured thereto the remaining member 2 constructed of any preferred non-conducting material. The member 1 of the body or frame carries a diaphragm 3 which rests upon a ring 4 of rubber, paper, or other suitable material, the diaphragm being held against this ring by suitable spring fingers 5 projecting inwardly from the ring 1 and of any number found necessary. The diaphragm 3 is preferably non-metallic and may be constructed of glass, mica, wood, vulcanite, or other similar material. Secured to the diaphragm is a series of carbon contact pieces or electrodes 6, four being shown.

The member 2 carries adjustable metal or carbon electrodes or contact pieces 7, preferably slightly convex at their contact points and corresponding to the electrodes 6 upon the diaphragm, the electrodes or contact pieces 7 being arranged opposite the electrodes 6, and therefore four are shown as being used in the particular transmitter construction illustrated. The electrodes 7 are held upon radially arranged metal arms 8 from which outwardly extend adjustable flat springs 9 secured to the frame 2 by screws 10 and engaged by intermediate adjusting screws 10$^a$ which control the normal pressure contact between the electrodes 7 and 6. This normal pressure contact may also be obtained by gravity, as well as by spring pressure, or by both combined. Any suitable mouth piece 11 may be used with this transmitter.

The general plan or arrangement of the circuit connections is clearly shown in Fig. 1 and may be described as follows: The current coming in at the terminal 12 passes to a binding post 12$^a$ and from the latter, through the medium of a wire 13, to one of the spring supported arms 8 carrying one of the electrodes 7. From this first connected electrode 7 the current traverses the corresponding electrode 6 on the diaphragm, and through the medium of a wire 14 the said electrode 6 is connected to a succeeding arm 8 and another electrode 7, and from the electrode 6 corresponding to the latter electrode 7, the current continues through a wire 16 to a successive arm 8 and its electrode 7, to the coacting or corresponding electrode 6, and therefrom a wire 17 runs to the remaining unconnected arm 8 and its electrode 7 and to the electrode 6 corresponding with the last named electrode 7, and thence by wire 19 to a binding post 18, the circuit being completed with the battery or other source of current supply or electric energy, by a wire 20 connected to the terminal 21. By this arrangement of connecting the electrodes in series, the normal internal resistance is increased and in proportion to the number of electrodes or variable resistances connected up in series, as for instance, if the wire 20 be connected to the wire 14 but two electrodes constituting a variable resistance are in circuit and the normal resistance is lowest, and by connecting wire 20 to wire 16, it is doubled, and with wire 20 connected with wire 17 it is tripled, and with wire 20 connected to wire 19 at the binding post 18 it is quadrupled, giving at this last connection the maximum resistance of the transmitter.

While but four fractional parts or units or sets of electrodes or variable resistances are shown, as herinbefore noted, it will be understood that any number of similar sets, solid or granular, may be used to increase the total normal resistance of the transmitter and proportionately with the increase of parts or units up to any required or desired normal maximum internal variable resistance. The addition of any number of similar sets of electrodes of variable resistances in excess of four, as shown, will require but an obvious multiplication of the fractional parts or units. It will also be understood that the change of connection of the wire 20 to the different parts or units connected up in series may be readily accomplished by means of a simple multiple or four or more way switch of any of the well known forms generally used.

Fig. 3 illustrates one practical embodiment of the arrangement just specified, and therein the diaphragm is non-metallic as in the construction shown by Figs. 1 and 2, and coöperating with this diaphragm are cups similar to those heretofore described and having the same reference characters applied thereto and which hold the variable granular resistance material, electrodes being operatively associated with the cups and arranged as in the construction shown by Figs. 1 and 2. In this instance a series of switches S, S', S$^2$ are secured on the member 2 of the casing or body of the transmitter, said switches each having their respective contact buttons $b$, $b'$, $b^3$, $b^4$, $b^5$, $b^6$ and their respective connecting wires. A battery B and an inductorium I are also shown in this arrangement and the connections from and to the battery are as follows: from the battery B to 12$^a$ by the wire 12, as in the construction shown by Figs. 1 and 2, then by wire 13 to the top electrode 7 adjacent to 12$^a$, the corresponding cup or lower granular resistance material serving as a coöperating electrode being connected by wire 14 to switch S between the buttons $b$ and $b'$. From the button $b$ a wire 25 runs to binding post 18 and through the medium of wire 20 to the primary coil of the inductorium I and thence back to the battery, whereby only one part or unit of the transmitter may be used. To connect in another unit, switch S is changed or shifted to contact with the button $b'$, being in the previous instance placed in contact with the button $b$. Between the button $b'$ and the second electrode 7, a wire 14' extends, and the corresponding lower electrode 6 or granular variable resistance material is connected to the switch S' by a wire 16 and from S' through button $b^3$ by wire 25 back to the battery as before, thus permitting the utilization of two units and doubling the internal normal resistance of the transmitter. The remaining units, two or more, are connected in series in the same manner. It will be seen that by changing the wire 12 to connect with any one of the switches S, S' and S$^2$, either unit can be used independently of the others.

As shown, the transmitter is connected directly in the circuit with the source of current supply, but it will be obvious that the primary of an induction coil or transformer can be included in the circuit with the transmitter and the source of electric supply, if desired, in a well known manner, the secondary of said coil being connected to line in the usual manner.

This invention is not intended to be limited to the particular construction of transmitter shown, nor to the use of solid carbon electrodes, as the fractional parts or units may consist of granules of carbon suitably arranged and held in any of the well known ways, or other variable resistances may be used, the main feature being the subdivision of the total resistance into independent fractional parts or units, each unit being variable and having means coöperating therewith for connecting the same in series at will or as may be desired.

What is claimed as new, is:

1. A telephone transmitter having a diaphragm, a plurality of independent variable resistances or electrodes carried thereby and insulated therefrom, a corresponding plurality of independent coöperating electrodes insulated from one another and from the diaphragm and engaging the said independent variable resistances or electrodes carried by the diaphragm, and means for connecting in series, in whole or in part, the resistances or electrodes carried by the diaphragm and the independent coöperating electrodes engaging therewith whereby the internal resistance of the transmitter may be varied.

2. A telephone transmitter having a given variable resistance subdivided into fractions or units, a vibrator, each unit being insulated from the vibrator and having its own variation produced by said vibrator, the vibrator being common to all the units and the latter normally insulated from one another, contact means and a source of current supply with which the units are adapted to be connected up in series, in whole or in part, and adjustable means also connected to portions of the units and coöperating with the contacts.

In testimony whereof I have hereunto set my hand in presence of two subscribing witnesses.

CHARLES ADAMS-RANDALL.

Witnesses:
 DOUGLAS SWIFT,
 JOSEPH FIELL.